United States Patent
Jones et al.

(10) Patent No.: US 7,013,501 B2
(45) Date of Patent: Mar. 21, 2006

(54) FLOOD PROTECTION APPARATUS

(76) Inventors: Robert Alexander Jones, Dee View, Chester Road, Flint, North Wales (GB) CH6 5DT; Peter Anthony Jones, Sevenoaks, Coed Llys. Bryn-y-Garreg, Flint Mountain, North Wales (GB) CH7 6PG ( * ) Notice: Subject to any disclaimer, the term of this patent is extended or adjusted under 35 U.S.C. 154(b) by 0 days.

(21) Appl. No.: 10/439,685

(22) Filed: May 16, 2003

(65) Prior Publication Data

US 2004/0006816 A1   Jan. 15, 2004

Related U.S. Application Data

(63) Continuation-in-part of application No. PCT/GB01/05070, filed on Nov. 16, 2001.

(30) Foreign Application Priority Data

| Nov. 16, 2000 | (GB) | .................................... 0028063 |
| Nov. 16, 2000 | (GB) | .................................... 0028064 |
| Nov. 16, 2000 | (GB) | .................................... 0028065 |
| Nov. 16, 2000 | (GB) | .................................... 0028067 |
| Jan. 12, 2001 | (GB) | .................................... 0100809 |

(51) Int. Cl.
*A47K 1/14*   (2006.01)

(52) U.S. Cl. .......................................................... 4/295

(58) Field of Classification Search .................... 4/253, 4/255.01, 255.04, 255.08, 295
See application file for complete search history.

(56) References Cited

U.S. PATENT DOCUMENTS 2,055,801 A * 9/1936 Perry .......................... 4/255.08
4,112,527 A * 9/1978 Giubilo .......................... 4/253

* cited by examiner

*Primary Examiner*—Robert M. Fetsuga
(74) *Attorney, Agent, or Firm*—Taylor Russell & Russell, P.C.

(57) ABSTRACT

Apparatus for sealing an aperture against ingress of floodwater is disclosed. The apparatus comprising a cover portion for covering and forming a seal around an aperture, and location means for engaging with a component associated with the aperture to retain the cover portion in place. For example, the locating means may include a securing element that engages with the fixed component, and screw threaded components to draw the cover portion into place. Embodiments of the invention may be applied to seal an aperture such as an airbrick, a wastewater outlet, an overflow, etc. Further apparatus comprises a sealing portion and a securing portion whereby the apparatus can be disposed for use in a toilet bowl such that the sealing portion is retained in position by the securing portion to substantially seal an outlet of the toilet bowl. Once the risk of flooding has passed, the apparatus can be removed.

3 Claims, 8 Drawing Sheets

FLOOD PROTECTION APPARATUS

This is a continuation-in-part of International Application PCT/GB01/05070, with an international filing date of Nov. 16, 2001, published in English under PCT Article 21(2) as International Publication Number WO 02/40785 A2.

BACKGROUND TO THE INVENTION

Field of the Invention

This invention relates to flood protection apparatus. In particular, it relates to flood protection apparatus that can be deployed to protect premises against inundation of floodwater through a toilet and to a flood protection aperture seal.

When a property occupier is presented with the prospect of preventing floodwater entering their property, one of the most daunting problems that they must face is the large number of and variety of the number of apertures that are formed through the walls of a typical building. All of these apertures must be sealed if ingress of floodwater is to be prevented.

Protection of door and window apertures has been addressed in our UK patent application No. 0102215.1 and International Patent Application No. PCT/GB01/04897, and protection of overflow pipes and toilet waste outlets is addressed in out UK patent applications filed on the same date as this application. However, there remain other apertures such as waste outlets and overflows of sinks and baths, and wall air vents that still require protection. It is protection of this latter type of apertures to which this application relates.

SUMMARY OF THE INVENTION

One aspect that is shared in common with the apertures to which this invention relates is that they are often spanned by one or more transverse members. These members may, for example, be a grille of a waste outlet, a support for a rising outlet plug of a waste outlet, or members of a grille of an airbrick. Alternatively or additionally, the aperture may have a periphery upon which a grip can be obtained. The inventors have realised that such a transverse member or the periphery of an aperture can be used to assist in sealing the aperture.

From a first aspect, this invention provides apparatus for sealing an aperture against ingress of floodwater comprising a cover portion for covering and forming a seal around an aperture, and location means for engaging with a fixed component associated with the aperture to retain the cover portion in place.

Such apparatus can be used to seal an aperture through which floodwater might otherwise enter a building.

The cover portion may carry a sealing element that, in use, forms a seal between the cover portion and material at the periphery of the aperture.

The location means may comprise an element that can be placed under tension to pull the cover portion into engagement with a peripheral region around an aperture to be sealed. The tension element may pass through the cover portion. For example, the tension element may be a bolt. In such cases, the locating means may further comprise a nut that is in threaded engagement with the bolt.

Additionally, the locating means may provide an engaging formation that can engage with and be retained by the fixed component. For example, the engaging formation may include a hook, for example, carried at an end region of an elongate element.

The fixed component with which apparatus embodying the invention may engage might be a periphery of the aperture or a component that extends across the aperture. As an example of the latter, the fixed component may be a grille, or a hole for the passage of fluid (e.g. water or ventilating air).

Apparatus embodying the invention may be provided in combination with additional mounting apparatus that can be disposed in relation to an aperture to provide a formation upon which the locating means can engage. Such additional mounting apparatus can be deployed where there is no existing formation for the location means to engage.

From a second aspect, the invention provides a flood protection kit including a plurality of apparatus for sealing an aperture against ingress of floodwater embodying the first aspect of the invention. These are typically suitable for application to a range of different apertures. A kit embodying this aspect of the invention may further include additional mounting apparatus as defined in the last-preceding paragraph.

In flood conditions, one of the most damaging and unpleasant routes for floodwater to enter premises is by reverse flow in the drainage system that causes water to emerge from a toilet bowl. This form of floodwater ingress cannot be prevented by the conventional measure of blocking doors and windows, for example with sandbags, nor by the door and window protection apparatus disclosed in our UK Patent Application No. 0102215.1. As the level of floodwater increases, it may enter the building through an overflow pipe that is normally provided for the cistern of a toilet.

Given that a toilet is an expensive installation that is often part of a suite, and for many, flooding is a rarity, the inventors have realised that it is unlikely that many householders would be tempted to install any flood protection measure that involved changing the toilet bowl or other apparatus. Therefore, they have concluded that a more effective solution is to provide apparatus that can be rapidly disposed, in the event of a flood warning, to guard against inundation in the event of a flood.

Therefore, from a third aspect, this invention provides flood protection apparatus comprising a sealing portion and a securing portion whereby the apparatus can be disposed for use in a toilet bowl such that the sealing portion is retained in position by the securing portion to substantially seal an outlet of the toilet bowl.

Such apparatus can be brought into use as and when there is a risk of flooding, and can subsequently be removed, leaving the toilet bowl unaltered from its original condition.

Most advantageously, the apparatus is adjustable such that it can be installed in a variety of different toilet bowls. In particular, the securing portion is advantageously adjustable to cooperate with a variety of toilet bowls.

In typical embodiments, the sealing portion is configured to form a seal within a waste outlet of a toilet bowl. For example, the sealing portion may have a tapering peripheral wall that can be accommodated within various waste outlets of different dimensions, a seal being formed between the peripheral wall and material of the toilet bowl.

Preferably, the sealing portion is formed of a resilient material that can be deflected so that it can conform to a surface of a toilet bowl against which it is to form a seal. This allows one configuration of a sealing portion to cooperate with a variety of differently shaped toilet bowls.

Deflecting means may be provided, operation of the deflecting means causing resilient deformation of the sealing portion to enhance its sealing effectiveness. For example, the deflecting means may cause the sealing portion to compress in a first direction, and thereby expand in a transverse direction.

In a first arrangement, the securing portion may operate to pull the sealing portion into place. For example, it may cooperate with a suitably shaped part of the waste outlet of the toilet bowl, such as a part of the U-bend.

Alternatively or additionally, the securing portion may operate to press the sealing portion into place. In one preferred arrangement, the securing portion may engage with an underside of a rim portion of a toilet bowl. For example, the securing formation may comprise rim-engaging formations for engaging with a rim portion, the spacing between the rim-engaging formations being adjustable to conform to different sizes of toilet bowl. The rim-engaging formations may be carried on a bar of adjustable length. In such embodiments, the securing portion is preferably provided with a strut disposed to apply a force to the sealing portion. Advantageously, the strut is of adjustable length to accommodate variations in the configuration of the toilet bowl and to facilitate deployment of the apparatus.

The inventors have also realised that the presence of a toilet or other plumbing apparatus employing a cistern, especially in a lower floor of a building, can give rise to a further risk in the event of flooding. Such an installation will most usually incorporate an overflow to ensure that water can escape in the event that a level-controlling valve of the cistern fails to operate properly. It is common for such an overflow to include a pipe that exits to the exterior of the building. This can provide an entry path for floodwater.

From a second aspect, this invention provides apparatus for preventing floodwater for entering an overflow pipe in conditions of flooding, comprising a first component installed at an open end of the overflow pipe, and a second component, operably connectable to the first component, to seal the pipe in conditions in which flooding is expected. Apparatus embodying this aspect of the invention is most advantageously provided in combination with apparatus embodying the first aspect of the invention.

The first component of apparatus embodying this aspect of the invention may be permanently or semi-permanently installed on the overflow pipe. For example, it may be secured there by adhesive. The second component is typically removable from the first component when conditions of flooding have passed.

In a typical embodiment, the second component may be secured to the first component by mutually-engagement of threaded portions of the two components.

From a third aspect, the invention provides a flood protection system comprising flood protection apparatus according to the first aspect of the invention in combination with apparatus for preventing floodwater for entering an overflow pipe according to the second aspect of the invention.

The various aspects of the invention have been described above with reference to protection of buildings against flooding risks. However, it may also find application to protect boats from inundation. Many boats, from small yachts upwards in size, are equipped with flushing toilets. It is known that these can provide a route through which water can enter the vessel, either when it is moored, or when it is underway in rough conditions. Embodiments of the invention might therefore be deployed to prevent water entering the vessel under such circumstances.

DETAILED DESCRIPTION OF THE PREFERRED EMBODIMENTS

Figure 1:
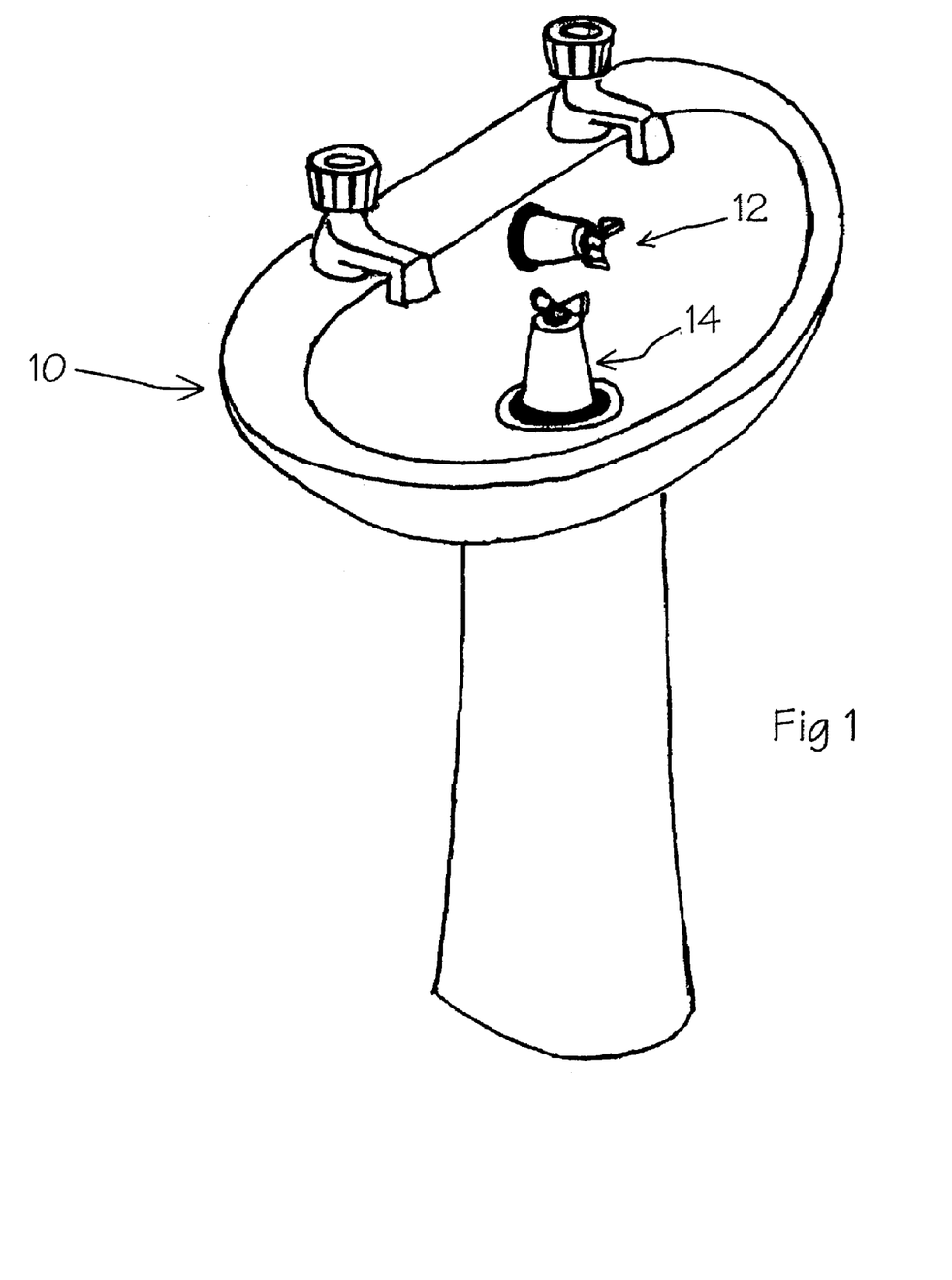
FIG. 1 shows a wash-hand basin equipped with two sealing covers each being apparatus embodying the invention.

With reference first to FIG. 1, a typical wash-hand basin 10 is shown. This has two apertures intended to let water out of the basin; a wastewater outlet and an overflow. However, in times of flooding, both of these can be potential points of entry for floodwater. As shown in FIG. 1, two sealing covers 12, 14, each being an embodiment of the invention have been deployed to protect these two potential risk points.

The two covers shown in FIG. 1 are largely similar in construction, the principal difference between them being one of size. The cover 14 applied to the wastewater outlet is shown in FIG. 2.

Figure 2:
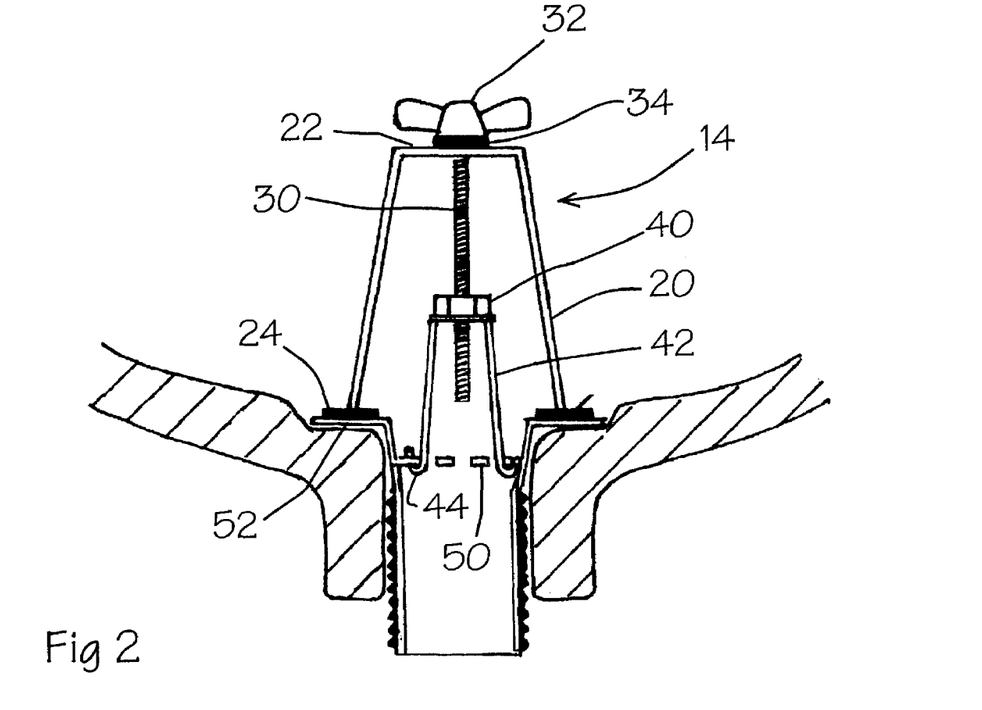
FIG. 2 is a transverse section of a sealing cover in place on the drain outlet in the wash-hand basin of FIG. 1.

With reference to FIG. 2, the sealing cover includes a cover portion 20 formed as a hollow frusto-conical moulding of stiff plastic material. At its end of lesser diameter, the cover portion 20 has a closing end wall 22. It is open at its end of greater diameter. A central aperture is formed through the end wall 22. A resilient annular seal 24 is provided at the open end of the cover portion 20.

The sealing cover further includes securing means to secure it in place on the wastewater outlet. The securing means comprises an elongate bolt 30 that extends axially of the cover portion 20 through the aperture in the end wall 22. A head 32 of the bolt 30 is shaped as a wingnut to enable it to be without the aid of tools. An annular sealing washer 34 of resilient material is disposed between the bolt heads 32 and the end wall 22.

Figure 3:
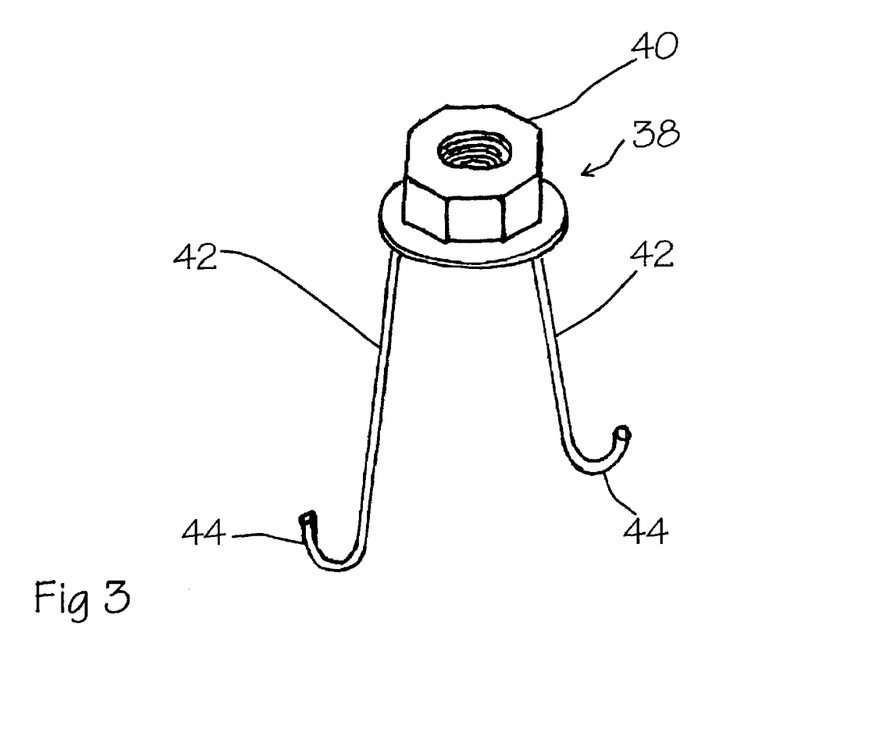
FIG. 3 shows a component of securing means of the apparatus of FIG. 2.

The securing means further includes a locating component 38, shown in FIG. 3. The locating component 38 includes a nut 40 from which two elongate resilient metal locating legs 42 project. Each locating leg 42 has a hook portion 44 formed at an end portion remote from the nut 40. The nut 40 of the locating component 38 is carried in threaded engagement with the bolt 30, such that the locating legs 42 project generally away from the end wall 22 of the cover portion.

The procedure to deploy the apparatus will now be described.

The locating component 38 is positioned such that its nut 40 is towards the free end of the bolt 30. The hook portions 44 of the locating legs 42 are then located on a suitable structure. In this example, the structure chosen is a grid 50 provided to trap objects that are dropped into the wastewater outlet. However, in the case of apparatus applied to the overflow, the periphery of the overflow aperture may be used instead.

The bolt 30 is then turned to draw the nut 40 towards the end wall 22. This, in turn, places the bolt 30 under tension and this urges the cover portion 20 towards the wastewater outlet. The seal 24 is compressed between the cover portion 20 and the periphery of the aperture so that a fluid-tight seal is formed between the cover portion 20, the seal 24 and the periphery of the aperture. The sealing washer 34 is also compressed to form a seal at the end wall 22 of the cover portion 20. In the case of a wastewater outlet, there is typically a bezel 52 at the periphery of the aperture that provides a surface against which a good seal can be formed.

Figure 4:
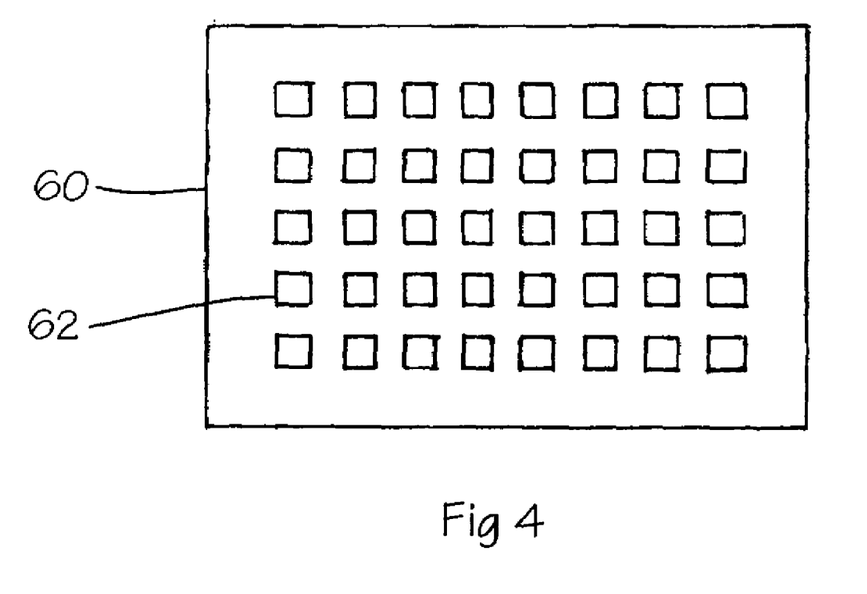
FIG. 4 shows an airbrick upon which apparatus embodying the invention is to be mounted.
Figure 5:
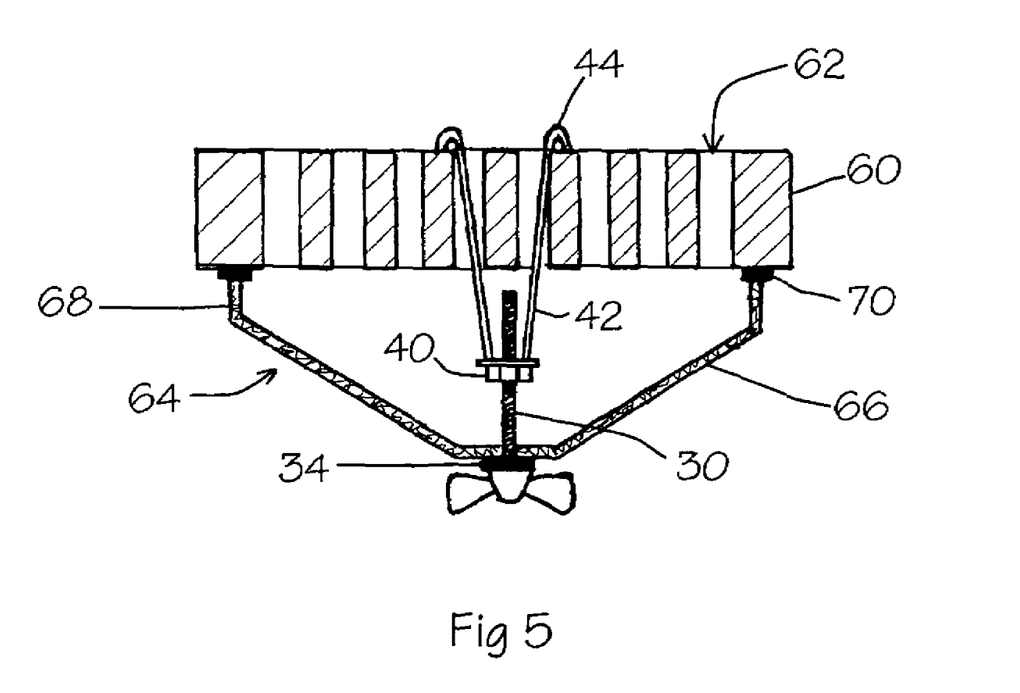
FIG. 5 is a transverse view of the airbrick of FIG. 4 having apparatus embodying the invention mounted upon it.
Figure 6:
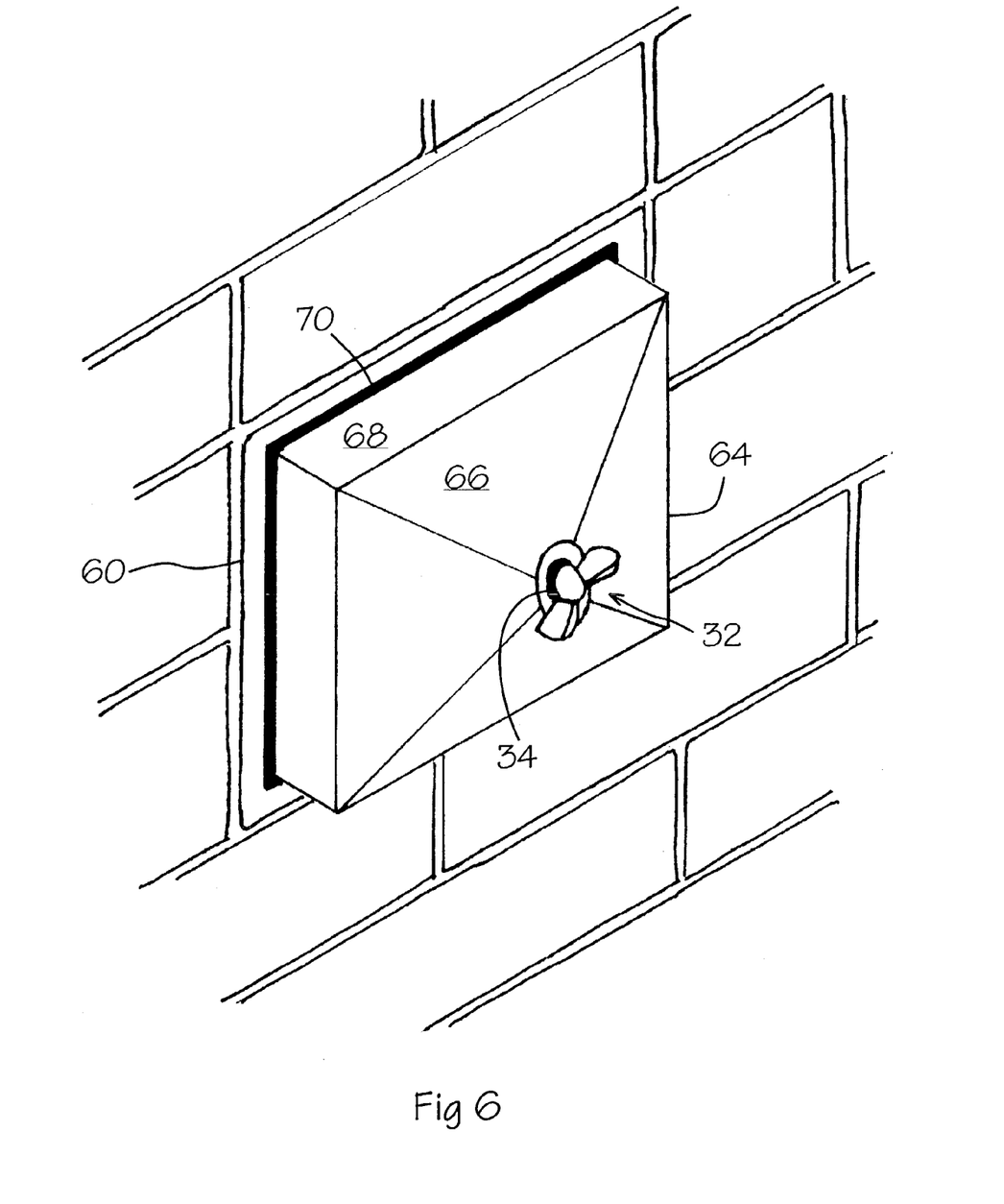
FIG. 6 is an external view of the apparatus of FIG. 4 in place on the airbrick.

An alternative embodiment is shown in FIGS. 4 to 6. In this case, the sealing cover is intended to form a seal to cover an airbrick 60.

An airbrick is typically built into a wall to provide a route for ventilating air to pass through the wall. The example shown in FIG. 4 is a simple airbrick with air holes 62 disposed in a regular rectangular array; however, there are many alternative patterns. The airbrick may be formed of ceramic (like a building brick), metal, plastic or other material.

This sealing cover has a cover portion 64 that has a generally rectangular outline shape. An outer wall 66 of the cover portion 64 is domed to confer the outer wall 66 with strength in compression. The outer wall 66 has a central aperture. A peripheral wall 68 of rectangular outline extends from the outer wall 66. A resilient sealing element 70 is carried on an end surface of the peripheral wall 68.

This embodiment has locating means substantially as described above, although it may be of a larger scale, if appropriate. The bolt 30 of the locating means passes through the central aperture of the outer wall 66. This is shown most clearly in FIG. 5.

To deploy this sealing cover, the legs 42 are each inserted through a hole 62 in the airbrick 60. The bolt head 32 is then turned to rotate the bolt 30 and draw the nut along its length to clamp the cover portion 66 against the airbrick 60. The sealing element 70 is then compressed between the airbrick 60 and the peripheral wall 68 to form a fluid-tight seal. The sealing washer 34 likewise is compressed to form a seal between the bolt head 32 and the outer wall 66, the domed shape of the outer wall 66 resisting the compressive force applied to it.

Figure 7:
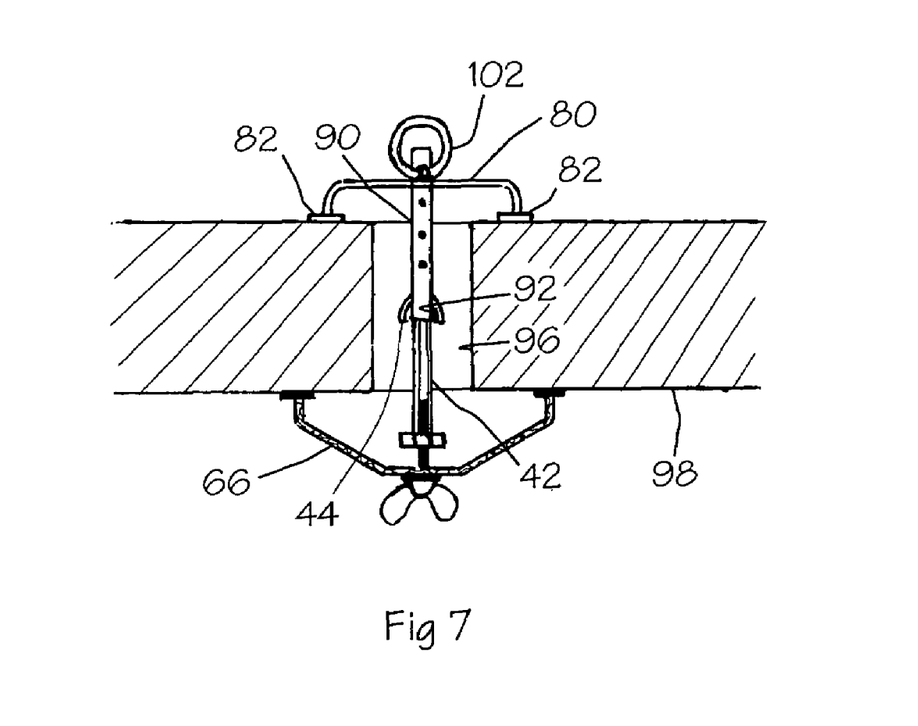
FIG. 7 is a cross-section of apparatus embodying the invention deployed in conjunction with additional mounting apparatus.
Figure 8:
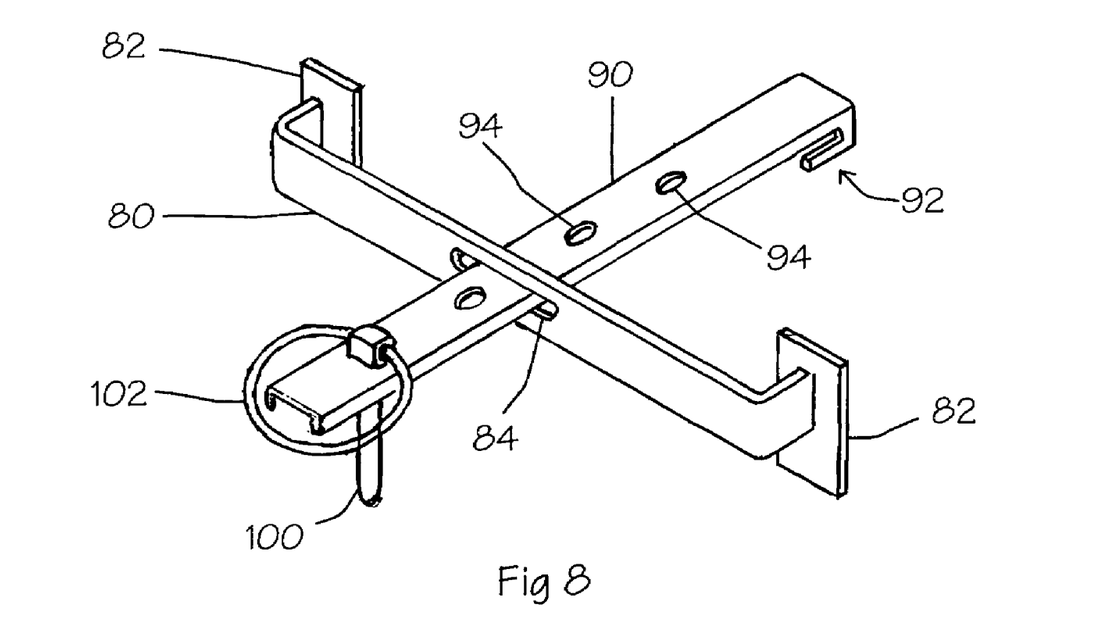
FIG. 8 shows the additional mounting apparatus in FIG. 7 in greater detail.

As will be understood, deployment of the embodiment described above can meet with difficulties if the aperture has no suitable formation upon which the location means can engage. There may, for example, be no transverse element, or the aperture may be too deep for the legs to reach to form an engagement. With reference to FIGS. 7 & 8, additional mounting apparatus is shown that presents a solution to this problem.

The additional mounting apparatus comprises a transverse metal bar 80. A respective flat mounting pad 82 is carried at opposite end regions of the transverse bar, the mounting pads 82 being disposed substantially in a common plane. A slot 84 is formed through a central region of the bar 80.

The additional mounting apparatus additionally includes a flat longitudinal metal bar 90 that extends through the slot 84. One end portion of the longitudinal bar 90 is formed as a hook 92. Several holes 94 are formed through the longitudinal bar 92 spaced along its length.

To deploy the additional mounting apparatus, the transverse bar 80 is placed across an aperture 96 to be sealed with the pads 82 being placed in contact with an inner surface of a wall 98 in which the aperture is formed, such that the longitudinal bar 90 is inserted into the aperture 96, with its hook portion 92 within the aperture 96. A locating pin 100 is then inserted through one of the holes 94 to secure the longitudinal bar 92 against removal from the slot 84. The pin 100 has a head that cannot pass through the hole and a ring 102 that can be used to grip the pin 100 for removal.

Once the additional mounting apparatus is installed as discussed above, the sealing cover can then be deployed as shown in FIG. 7. The hook portions 44 of the legs 44 can engage upon the hook portion 92 of the longitudinal bar 90 to secure the sealing cover in place.

The embodiments are described as being for installation in a building. However, the invention has equal applicability to application in boats (typically in yachts and larger boats) to prevent inundation of water through apertures such as drains or ventilators in the boat. It is likely that the embodiments for use in boats is likely to be very similar to those described above with little modification.

A property owner or a boat owner may be provided with a flood protection kit that includes several different embodiments, intended to cover a range of apertures in advance of a flood. The kit may also include additional mounting apparatus as described with reference to FIGS. 7 and 8.

Figure 9:
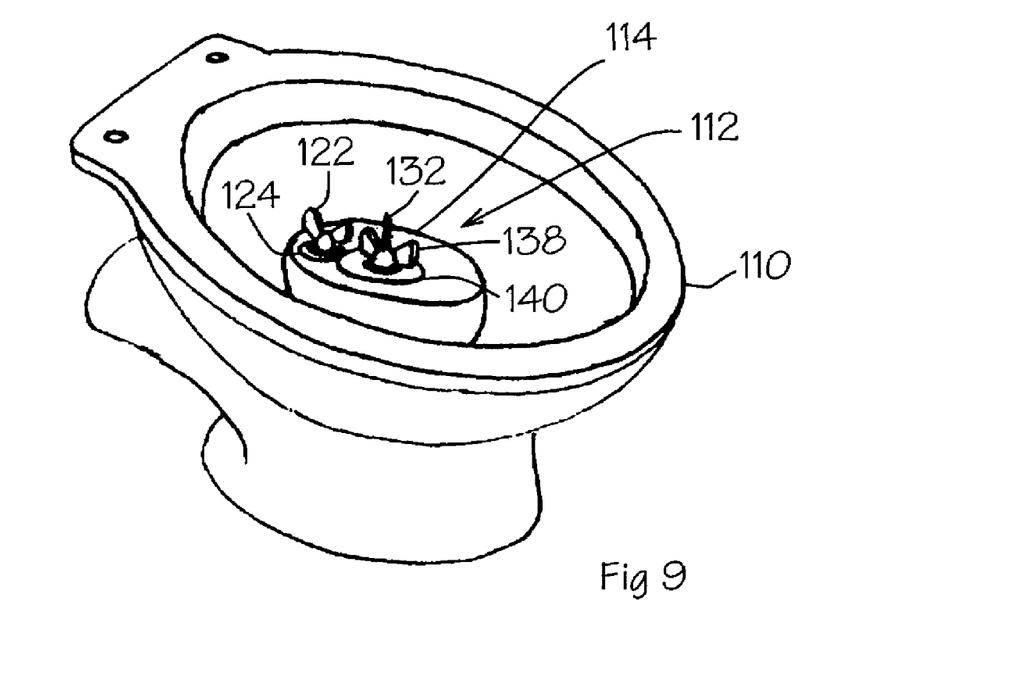
FIG. 9 shows a toilet bowl with flood protection apparatus being another embodiment of the invention installed.
Figure 10:
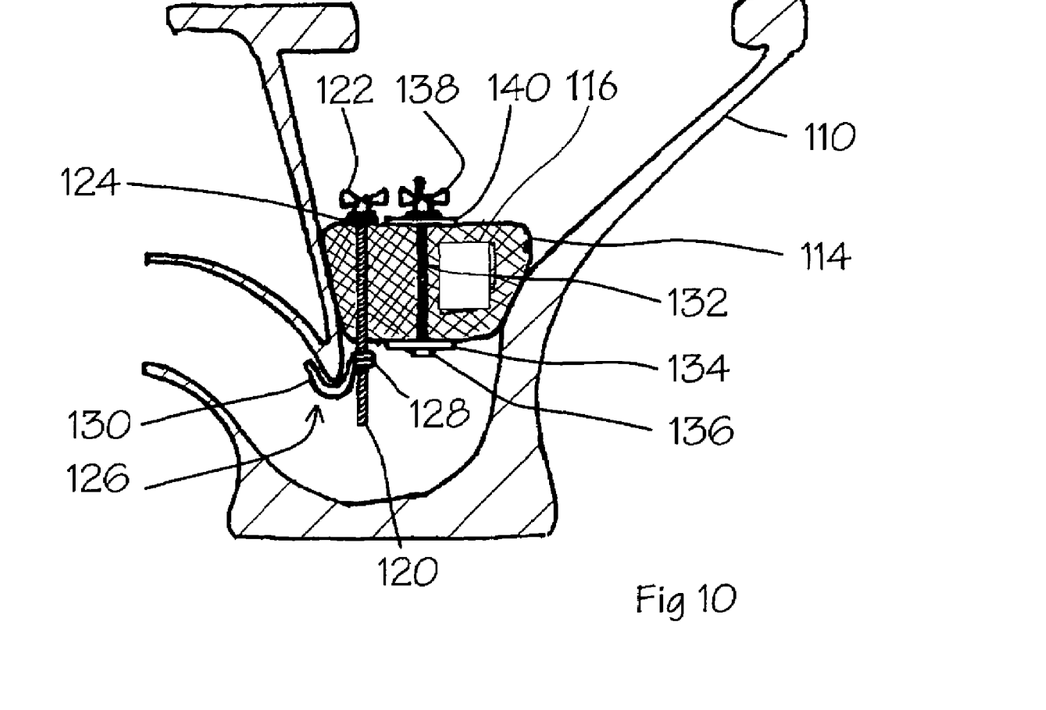
FIG. 10 is a cross-section of the toilet bowl of FIG. 9.

With reference first to FIGS. 9 & 10, apparatus 112 being a first embodiment is shown for preventing inundation of floodwater through a waste outlet of a toilet bowl 110.

The apparatus comprises a sealing body 114. The body 114 is formed of a resilient material such as a high-density polymer. For example, a synthetic rubber material may be used. To enhance the sealing properties of the sealing body, it may be provided with a coating of a sealing material, such as compressible synthetic polymer foam. The sealing body 114 is formed with generally flat upper and lower surfaces, and a tapered peripheral surface. The peripheral surface is shaped to be as close as possible a fit within the waste outlet of a typical toilet bowl to form a fluid-tight seal. One or more voids 116 are formed within the sealing body. Thus, it is not solid, but has internal spaced containing air or other gas. This allows it to compress and distort when a force is applied to it. This enables the sealing body to conform to an opening into which it is urged, thereby ensuring that it can form a seal within a range of toilet bowls of differing sizes and shapes.

Securing means is carried on the sealing body 114. The securing means comprises an elongate threaded rod 120 that passes through a bore formed through the sealing body 114. At an end region of the rod 120, there is provided a manipulation formation 122 that can be used by a person to turn the rod about a longitudinal axis. In this embodiment, the manipulation formation is shaped generally like a wing-nut. The manipulation formation 122 has a flat lower surface that bears against a washer 124 carried on the upper surface of the sealing body 114. The securing means further includes a bracket 126. The bracket has a threaded boss 128 that is carried in threaded engagement upon the rod 120. A hook portion 130 of the bracket 126 extends laterally from the boss 128. The hook portion 130 is shaped and configured such that it can engage with a downwardly pointing projection at the U-bend of the toilet bowl.

An elongate bolt 132 extends through a bore in the sealing body 114. A head 136 of the bolt 132 bears against a washer 134 that is carried on the lower surface of the sealing body 114. A wingnut 138 is carried on the bolt 132. Between the wingnut 138 and the upper surface of the sealing body 114 there is a washer 140. The wingnut 138, bolt 132 and washer 140 together constitute deflecting means for the sealing body 114.

To deploy the apparatus in use, the bracket 126 is positioned towards the lower end of the rod 120. The apparatus is then lowered into the toilet bowl 110, and manipulated such that the hook portion 130 of the bracket 126 locates upon the projection (which will typically be below the level of water within the bowl). The manipulation formation 122 is then used to turn the rod 120 to draw the bracket along the rod 120. The hook portion 130 engages with the protection, causing the rod 120 to be pulled downwards. Contact between the manipulation formation 122 and the washer 124 causes the sealing body to be urged downwards into the waste outlet of the toilet bowl, so securing it in place.

Once the sealing body is secured, the wingnut 138 is rotated to draw it along the bolt 132. The wingnut 138 makes contact with the washer 140. Continued rotation of the wingnut 138 causes the sealing body 114 to become compressed between the respective washers 134, 140 on its lower and upper surfaces. Being of resilient material, this compression causes the sealing body 114 to bulge laterally, thereby urging its peripheral surface into contact with the material of the toilet bowl, thereby causing a fluid-resistant seal to form at the peripheral surface.

Figure 11:
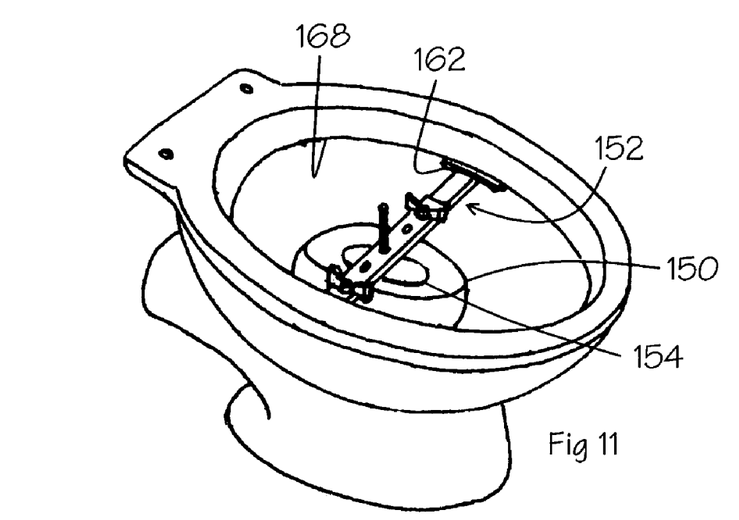
FIG. 11 shows a toilet bowl with flood protection apparatus being a further embodiment of the invention installed.
Figures 12, 13:
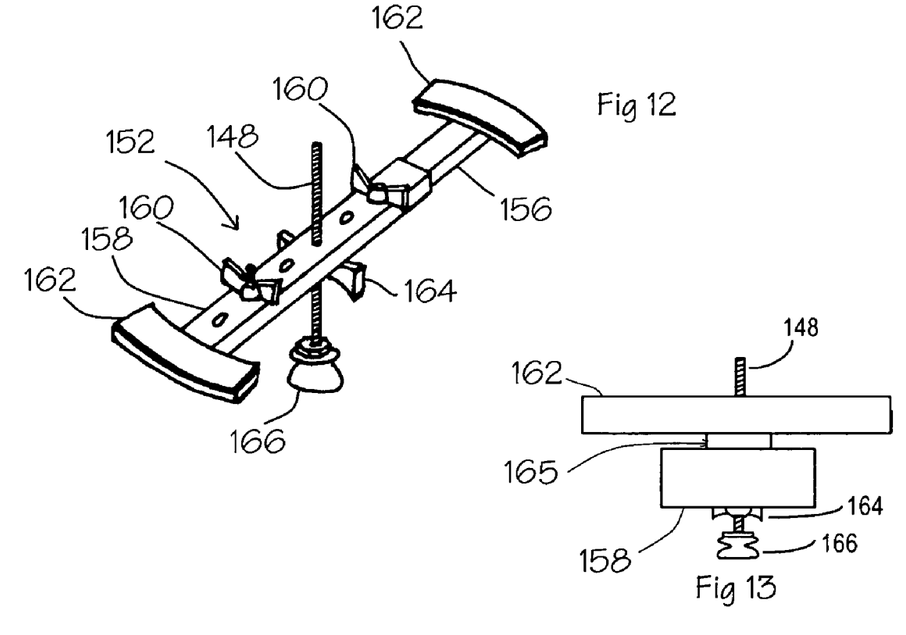
FIG. 12 shows a securing portion of the apparatus of FIG. 10.
FIG. 13 shows an end view of part of the securing portion of FIG. 12.

With reference now to FIGS. 11, 12 and 13, apparatus 112 being a second embodiment is shown. This apparatus comprises a sealing body 150 and a securing portion 152, the latter being shown in FIG. 12.

The sealing body 150 is of much the same construction as the corresponding component of the first embodiment, as described above, albeit without any bores being formed through it. In this embodiment, a metal plate 154 is carried on the upper surface of the sealing body 150.

The securing portion 152 comprises a first and a second elongate bar metal portion 156, 158. The second bar portion 158 is of hollow section, such that the first bar portion 15.6 can be inserted within it. The bar portions 156, 158 can then be slid with respect to one another to form a bar assembly of variable overall length. Two bolt and wingnut assemblies 160 are provided such that the bar assembly can be clamped at a selected length.

At an outer end region of each of the bar portions 156, 158 is carried a respective rim-engaging locating pad 162, formed of metal, and having a flat, upward-directed surface. The rim-engaging locating pads 162 are secured to the respective bar portions 156, 158 such that they can move pivotally with respect to the bar portions. A pivotable means 165 for enabling pivotable rim-engaging pads 162 connected to the bar portions 156, 158 may, for example, be achieved by connecting each pivotable rim-engaging locating pad 162 to the corresponding bar portion 156, 158 by a ball and socket joint. This allows the upwardly-directed surface of the pads to pivot away from being parallel to the bar portions 156, 158.

Generally centrally of the bar assembly (of course, this will be approximate as the length of the assembly is changeable) there is carried a location assembly. The location assembly comprises an elongate threaded rod 148 that passes through a central aperture in the bar assembly. A wingnut 164 is carried on the threaded rod below the level of the bar assembly. A pressure body 166 is carried at a lower end portion of the threaded rod 148. The pressure body 166 has a metal component that is secured to the threaded rod 148, and a resilient polymer body carried on the metal component for engagement with the metal plate 154 of the sealing body 150. The wingnut 164, threaded rod 148 and pressure body together constitute deflecting means for the sealing body 150.

To deploy the apparatus, the sealing body 150 is first located in the waste outlet of a toilet bowl. The length of the bar assembly is then adjusted such that its pads 162 can locate below opposite portions of the rim 168 of the toilet bowl. The wingnut 164 is then rotated to cause it to travel up the threaded rod 148. The wingnut 164 bears against the bar assembly, urging the bar assembly upwards to locate the locating pads 162 against a lower surface of the rim 168. The locating pads 162 will pivot such that they locate securely against the lower surface. At the same time, the rod 148 acts as a strut to urge the pressure body 166 against the meal plate 154 of the sealing body 150, thereby urging the sealing body 150 downwardly into the waste outlet of the toilet bowl. The pressure thereby applied forms a seal between the peripheral surface of the sealing body 150 and the material of the toilet bowl.

To enhance protection against floodwater gaining entry to a building through a toilet installation, the invention provides apparatus for protecting the overflow that is commonly provided as part of the installation of a toilet cistern.

Figure 14:
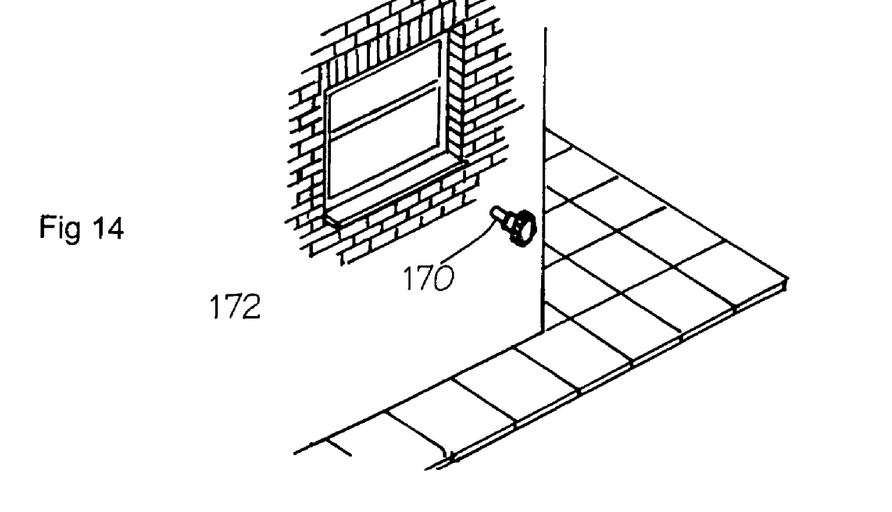
FIG. 14 shows apparatus being a further embodiment of the invention in place on a cistern overflow pipe.
Figure 15:
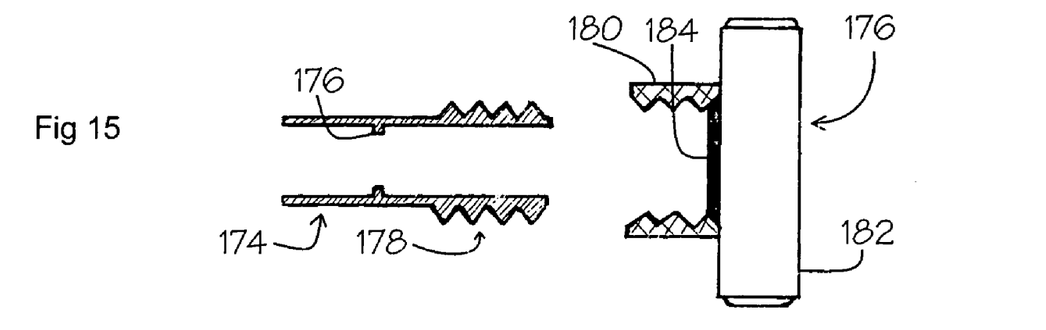
FIG. 15 shows the apparatus of FIG. 14 in cross-section.

A typical arrangement of such an overflow is shown in FIGS. 14 & 15. The overflow includes a pipe 170, normally of plastic material, that extends from the toilet cistern through an external wall 172 of a building, to open at the building's exterior. This allows water to run away harmlessly in the event that the cistern is overfilled. The external outlet of the pipe 170 draws attention of a building owner to the leaking water. (Note that a similar overflow can be associated with other cisterns such a feed tank for a hot water cylinder, and this invention can be applied to such an overflow. It is, however, uncommon for these to be situated at a height that floodwater is likely to reach.)

The apparatus of this embodiment includes a spigot component 174 and a cap 176, each being moulded of plastic material.

The spigot component 174 is tubular, and has an internal diameter that is a close sliding fit onto the overflow pipe 170, 50 that a first end region of the spigot component 174 can be slid onto the pipe 170, as shown in FIG. 15. There is advantageously a radial projection 176 within the spigot component that engages with an end surface of the pipe 170 to limit the distance to which the pipe 170 can enter the spigot component 174. (Note theta the radial projection should not project so far as to interfere with flow within the pipe.) An end region 178 of the spigot component 174, opposite that into which the pipe 170 is received, is formed with an external thread.

The cap 176 has a head 182 shaped as a squat cylinder, and a boss 180 that projects axially from the head 182. The boss 180 is tubular, and formed with an internal thread that can engage with the external thread of the spigot component 174. A sealing member 184 is located within the boss 180.

Figure 16:
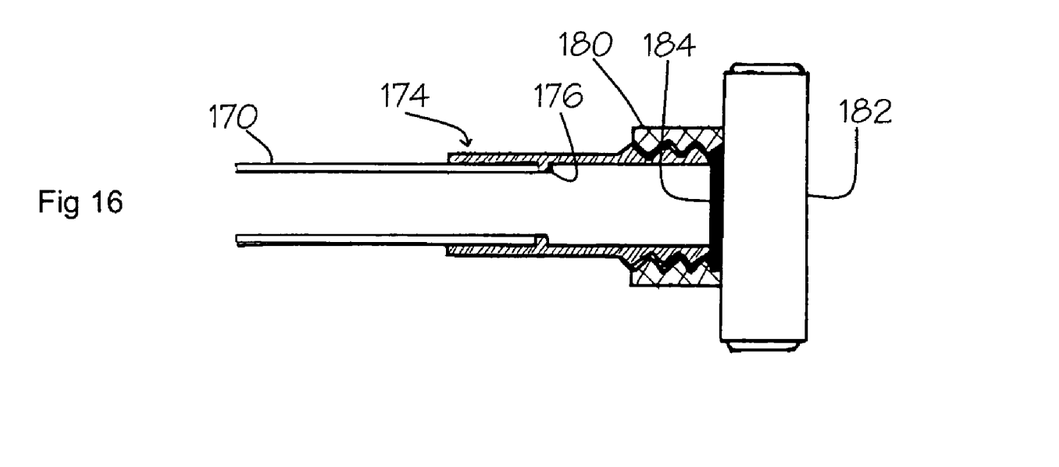
FIG. 16 shows the apparatus of FIG. 14 in place on an overflow pipe in cross-section.

To deploy the apparatus, the spigot component 174 must first be located upon the overflow pipe 170, and secured there. This is preferably done by way of adhesive. It is envisaged that the spigot component 174 be secured on the overflow pipe 170 in advance of the need for its use, and left in place permanently. The overflow can then function as normal. If flood conditions are expected, the cap 176 can be screwed into place on the spigot component 174, its sealing member 184 forming a fluid-tight seal against an end surface of the spigot component 174. Of course, the cap 176 must be removed once the flood risk passes to restore operation of the overflow. The embodiments are described as being for installation in a building. However, the invention has equal applicability to application in boats (typically in yachts and larger boats) to prevent inundation of water through a toilet installation in the boat. It is likely that the embodiments for use in boats is likely to be very similar to those described above with little modification.

Typically, a flood protection system may comprise a plurality of components each being various embodiments of the invention.

What we claim is:

1. Flood protection apparatus comprising a sealing body and a securing portion whereby the apparatus can be disposed for use in a toilet bowl such that the sealing body is retained in position by the securing portion to substantially seal an outlet of the toilet bowl, in which the sealing body is configured to form a seal within a waste outlet of a toilet bowl and the sealing body is formed of a resilient material within which one or more voids are formed, whereby the sealing body can be deflected so as to conform to a surface of a toilet bowl against which it is to form a seal and in which the securing portion includes: a strut of adjustable length disposed to apply a force to the sealing body, the length being adjusted in use to urge the sealing body into a waste outlet of a toilet bowl; a bar of adjustable length; rim-engaging locating pads for engaging with a rim portion carried on the bar such that the spacing between the rim-engaging locating pads is adjustable to conform to different sizes of toilet bowl, the rim-engaging locating pads are pivotable with respect to the bar, the strut extending between the bar and the sealing body.

2. Flood protection apparatus according to claim 1 in which the sealing body has a tapering peripheral wall that can be accommodated within various waste outlets of different dimensions.

3. Flood protection apparatus according to claim 1 in which a seal is formed in use between the peripheral wall and material of the toilet bowl.

* * * * *